United States Patent [19]

Karle

[11] Patent Number: 4,861,655

[45] Date of Patent: Aug. 29, 1989

[54] THERMOPLASTIC MAGNETIC COATING COMPOSITION

[75] Inventor: Dennis W. Karle, San Jose, Calif.

[73] Assignee: Memorex Corporation, Santa Clara, Calif.

[21] Appl. No.: 904,730

[22] Filed: Sep. 8, 1986

[51] Int. Cl.$^4$ .............................................. G11B 5/74
[52] U.S. Cl. ................................ 428/328; 428/425.9; 428/694; 428/695; 428/522; 428/900
[58] Field of Search ............... 428/694, 328, 695, 329, 428/425.9, 522; 427/131; 528/64; 524/507, 407; 252/62.56

[56] References Cited

U.S. PATENT DOCUMENTS

| | | | |
|---|---|---|---|
| 4,152,484 | 5/1979 | Bachmann | 428/425.9 |
| 4,163,823 | 8/1979 | Legras | 428/329 |
| 4,352,859 | 10/1982 | Yoda | 428/900 |
| 4,357,378 | 11/1986 | Vaeth | 428/425.9 |
| 4,400,435 | 8/1983 | Yoda | 428/900 |
| 4,414,288 | 11/1986 | Kawahara | 428/900 |
| 4,451,535 | 5/1984 | Pingaud | 428/694 |
| 4,476,035 | 10/1984 | Miyoshi | 428/425.9 |
| 4,534,999 | 8/1985 | Roller et al. | 427/130 |
| 4,537,833 | 8/1985 | Kasuga | 428/425.9 |
| 4,562,117 | 12/1985 | Kikukawa | 428/900 |
| 4,594,174 | 6/1986 | Nakayama | 428/900 |
| 4,600,521 | 7/1986 | Nakamura | 428/900 |
| 4,608,315 | 8/1986 | Yoda | 428/900 |

OTHER PUBLICATIONS

Wacker-Chemie, "Vinnol-Solution Vinyl-Resins", technical brochure

Primary Examiner—Paul J. Thibodeau

[57] ABSTRACT

A magnetic recording medium comprises a substrate coated with a magnetic layer comprising a magnetic powder and a binder comprising an urethane resin and a vinyl chloride maleic acid copolymer having no maleic acid component and at least no more than about 0.5 wt. %.

13 Claims, No Drawings

THERMOPLASTIC MAGNETIC COATING COMPOSITION

SUBJECT MATTER OF INVENTION

This invention relates to magnetic media composition of matter having improved performance under environmental stress. More specifically, this invention relates to a thermoplastic binder system comprising a polyurethane resin and a copolymer derived from vinyl chloride, 2-hydroxypropyl acrylate and a maleic acid derivative. The maleic acid derivative is essentially devoid of acid groups and is present at a concentration of at least 7%. Further, this invention relates to a thermoplastic binder system comprised of a polyurethane resin and a vinyl copolymer, and having a glass transition temperature of about 25° to about 65° C.

BACKGROUND, FEATURES

In order to achieve good durability and related performance under environmental stress (cf. cyclic conditions of high temperature and humidity), present state-of-the-art, magnetic recording compositions tend to be cross-linked—especially where "premium" magnetic tape binder systems are involved. Cross-linking will be understood as the attachment of two chains of polymer molecules by bridges composed of either an element, a group or a compound which joins certain atoms of the chain by primary chemical bonds. It is recognized that cross-linking decreases elongation, increases strength, and enhances stability (cf. resistance to degradation from thermal, environmental, hydrolytic and/or chemical causes).

Currently, cross-linking is accomplished through a combination of chemical and thermal operations. The majority of current state-of-the-art binder systems utilize multifunctional isocyanates to produce an appropriate degree of cross-linking to various binders, or binder combinations, whereby to enhance resistance to environmental stresses consistent with the engendered recording application.

Typical prior art binder systems requiring cross-linking, generally using multifunctional isocyanates, to survive environmental stresses can be represented by the following classes of materials: polyurethanes, alone or in combination; phenoxy resins; vinyl resins such as vinyl chloride-vinyl acetate and vinyl chloride-vinyl acetate-vinyl alcohol, nitrocellulose, vinyl chloride-acrylonitrile, etc.

The value of cross-linking to achieve environmental stress stability has been described by R. J. Deffeyes in U.S. Pat. No. 4,020,227 as follows: "cross-linking also enhances the temperature stability of the coating. Consequently, it is desired that video recording tapes, tapes intended for use on high-speed computer transports and the like have cross-linked magnetic coating". A. Hosaka, Y. Isobe and K. Okuyama in U.S. Pat. No. 4,370,384 state that "conventional or thermoplastic combination of resins-urethane resin, vinyl chloride-vinyl acetate copolymer, cellulose resin, epoxy resin, phenoxy" lacks "satisfactory temperature and humidity resistance" (and) "reliability of storage of recorded data". Finally, M. Onizawa, in U.S. Pat. No. 4,128,539, in teachings not related to magnetic media, states that vinyl chloride resins require curing to increase thermal stability.

Here, we teach a magnetic coating that is not cross-linked, yet seems to have acceptable characteristics, including durability, even under environmental stress—something that will surprise workers. Workers will recognize that a thermoplastic system is preferable to a cross-linked one in many respects; e.g., more amenable to convenient fabrication methods (e.g., surface-finishing) and less variable over time (no pot life or other cure-continuance problems).

DISADVANTAGES ENCOUNTERED WITH CONVENTIONAL SYSTEMS

Binder compositions can be thought of as either "thermoset" (cross-linked) or "thermoplastic". Both types have process and performance advantages/disadvantages as currently understood. It should be noted that thermoset compositions were developed to overcome performance shortcomings of previous thermoplastic compositions.

A. Cross-Linking or Thermoset

Most thermoset compositions used in magnetic media employ (moisture-sensitive) multi-functional isocyanates to effect cross-linking. Cross-linking is achieved via reaction of multifunctional isocyanate materials with active hydrogen-containing moieties. As a result of the isocyanates' moisture sensitivity, several fabrication problems present themselves:
  (a) Pot Life—Such compositions are continuously changing during "hold-time" prior to coating.
  (b) Surface Treatment—Composition of coated magnetic tape changes during the course of the coating sequence as result of cross-linking reactions. Composition during surface treatment is not the same from end to end of the treatment line.
  (c) Product is not uniform from end to end of tape.

B. Thermoplastic Materials

As currently understood, thermoplastic formulations do not survive extreme environmental stress conditions, e.g., generating sticky debris, etc. Environmental disadvantages are enumerated in R. J. Deffeyes, U.S. Pat. No. 4,020,227, and A. Hosaka, Y. Isobe and K. Okuyama, U.S. Pat. No. 4,370,384 (see above).
  (a) Many thermoplastic formulations may survive ambient stresses but not environmental or cyclic environmental stresses. For example, high temperature/humidity conditions can lead to sticky debris, clog, loss of information, etc.
  (b) Thermoplastic compositions quite often (though not always) required addition of abrasive materials such as alumina to achieve durability.

I, here, teach of some new thermoplastic coating materials that exhibit acceptable durability (acceptable debris) without resort to abrasive particles under environmental stress—comparable, indeed, to cross-linked (thermoset) materials.

Novel Features

I have developed new thermoplastic compositions capable of surviving high environmental stress. Such compositions are prepared, formulated, coated and surface-treated (e.g., to survive environmental stress) for digital magnetic recording applications. Evaluation using standard test procedures demonstrates superiority in terms of an "Environmental Debris Generation Evaluation" (EDGE) test and of a 15-Day GSA testing (see below). My new thermoplastic formulations are not impacted by the usual environmental, operator and process constraints attendant on thermoset compositions. No critical "pot life" or other process windows are seen, and little or no moisture sensitivity. These new thermoplastic compositions require no abrasive materials such as alumina to achieve adequate durability.

In a preferred form of the present invention, a magnetic tape coating is prepared that is thermoplastic and comprises an elastomeric urethane and a vinyl copolymer which includes a maleic anhydride derivative essentially devoid of acid—this coating surviving extended service abrasion under high temperature/humidity conditions.

The invention will be better appreciated by workers upon consideration of the following detailed description of some preferred embodiments.

DESCRIPTION OF PREFERRED EMBODIMENTS

General description, background

Example I illustrates a magnetic tape coating formulated and applied according to principles of this invention.

This, and other means discussed herein, will generally be understood as selected, formulated, and operating as presently known in the art, except where otherwise specified. And, except as otherwise specified, all materials, methods, and devices and apparatus herein will be understood as implemented by known expedients according to present good practice.

Following are specific examples of the present invention and comparison test results demonstrating their usefulness and novelty. All can contain a carbon black conductive agent sold under the trade name Vulcan XC-72R by Cabot Corporation and a dispersing agent such as soya lecithin (liquid) sold by Central Soya Company, Inc. The compositions also preferably contain small quantities of stabilizers, Thermolite 31 and Thermolite 187, products of M and T Chemicals, Inc. Small quantities of lubricants are preferably present but not specified because they form no part of the novel subject claims. No abrasive type material is added (or needed) to improve durability. These compositions exhibit surprisingly excellent durability without the addition of an abrasive such as alumina. Magnetic (and other) pigments suitable for use in magnetic recording media (for computer, video, audio tape and flexible disk applications) are usable here.

Resin materials mentioned below (Table I) are sold under the trade names "Vinnol E22/48A" and "Vinnol VE20/55A" by Wacker Chemie, "Estane 5701F1" and "Hycar 1452X17" by B. F. Goodrich, and "VAGH" by Union Carbide. "Estane 5701F1" is a polyester polyurethane (high molecular weight elastomer—e.g., 50,000 or more, with no free isocyanate group) having excellent mechanical, chemical and physical properties and a glass transition temperature (Tg) of $-10°$ C.

"Vinnol E22/48A" (Tg, 70° C.), "Vinnol VE20/55A" (Tg approximately 74° C.) and "VAGH" (Tg approximately 78° C.) are vinyl chloride copolymers having structures I, II and III, respectively, as follows:

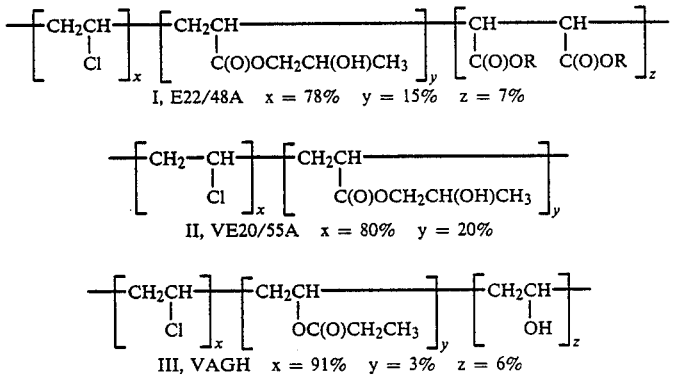

I, E22/48A $x = 78\%$ $y = 15\%$ $z = 7\%$

II, VE20/55A $x = 80\%$ $y = 20\%$

III, VAGH $x = 91\%$ $y = 3\%$ $z = 6\%$

The remaining material, "Hycar 1452X17", is an acrylonitrile butadiene copolymer; it may be employed as an elastomeric component.

The coating compositions are prepared by procedures well known in the art. Each mixture or composition is milled or dispersed in enough solvent to give a final coating composition of 30 to 40 percent non-volatiles. All compositions herein cited use cyclohexanone as solvent, though it is recognized that other solvents such as tetrahydrofuran, methyl ethyl ketone, etc. could be used. Dispersion is performed using high energy dispersion equipment until a stable/good quality dispersion is obtained as judged by visual/microscopic techniques. Coatings are rendered on polyethylene terephthalate substrate film, subjected to particle orientation, dried and surface treated.

Evaluations are performed on the subject coatings using standard test procedures known to those skilled in the art. Evaluations performed include magnetic/signal, environmental and mechanical performance. Environmental test results are reported in Table II.

A. Compositions of Matter

Following are specific examples of the compositions of matter used in the practice of the present invention.

EXAMPLE I

A magnetic tape coating for high speed digital magnetic recording is prepared having the following components in the indicated amounts. Example I is also listed in Table I.

| Component | % Coating Solids | Range |
|---|---|---|
| Magnetic Oxide (mag. pigment, $\gamma$-Fe$_2$O$_3$) | 68.96 | 50–80 |
| Soya Lecithin (dispersant) | 1.36 | 0.95–3.0 |
| Carbon XC-72R (conductive agent) | 6.69 | 3–8 |
| Estane 5701F1 (urethane) | 10.40 | 5–25 |
| Vinnol E22/48A (vinyl terpolymer) | 10.40 | 5–25 |
| Thermolite 31 (stability) | 0.11 | 0.01–0.2 |

-continued

| Component | % Coating Solids | Range |
|---|---|---|
| Thermolite 187 (stability) | 0.11 | 0.01–0.2 |
| Lubricants | 1.97 | 0.5–4.0 |

After dispersion, this coating is applied on a polyethylene terephthalate film substrate; then is oriented, dried, and surface treated/calendered. This coating exhibits good durability (on 6-inch shuttle, gives more than 100,000 shuttle cycles) and good environmental performance. Environmental performance tests may include a 15-Day GSA cycle and an EDGE Test (Environmental Debris Generation Evaluation), with results like those given in Table II.

Other like suitable magnetic pigments, dispersants, conductive agents and stabilizers may, in most cases, be substituted. In many cases the stabilizer will be optional. For instance, "UCARMAG-528" by Union Carbide is another suitable dispersant. Other magnetic pigments are $CrO_2$ (see below), cobalt-adsorbed $\gamma$-$Fe_2O_3$, $Fe_3O_4$, cobalt-adsorbed $Fe_3O_4$ and barium ferrite.

Example I shows exceptional environmental stability by registering passing 15-Day GSA cycle and low (1 rating) Environmental Debris Generation Evaluation values. In addition, six inch shuttle durability of greater than 100,000 passes was registered. All testing/performance parameters demonstrated the outstanding and unexpected environmental stability of the subject binder composition.

Examples II through X

In a similar manner, using appropriate binder combinations, analogous coatings are prepared and evaluated using substantially the same method as Example I. Coating compositions or binder ratios may vary from 85/15, 80/20, 70/30, 65/35 to 50/50. All compositions are coated on polyethylene terephthalate film, oriented, dried, surface treated and subjected to appropriate evaluation tests (see Table II).

These Examples show the surprising and outstanding environmental stability of the Estane 5701-F1, Vinnol E22/48A thermoplastic combination binder system over the range of binder ratios of 50/50, 65/35 and 85/15. This stability is readily apparent when Examples I, II, III and X with two or better EDGE ratings are compared with Examples IV through VIII with four (Fail) ratings.

Example XI

Example XI is prepared in the same manner as Example VIII except that a multifunctional isocyanate sold under the trade name of "CB-60", by Mobay, is added to the composition just prior to coating to induce crosslinking. A major surprise is that this (thermoset) material fails the EDGE test (Table II, possibly too brittle).

Example XII

A magnetic tape, suitable for high density digital recording, is prepared using chromium dioxide (D-500-02 produced by DuPont) as magnetic pigment and the following components in the amounts indicated below. Example XII is also listed in Table I.

| Component | % Solids | Range |
|---|---|---|
| Chromium Dioxide (Magnetic Pigment) | 80.0 | 70–85 |
| Soya Lecithin (dispersant) | 2.5 | 1–3.5 |
| Estane 5701-F1 (Urethane) | 7.7 | 5–20 |
| Vinnol E22/48A (Vinyl Terpolymer) | 7.7 | 5–20 |
| Lubricant | 2.0 | 0.5–4 |
| Thermolite 31 (Stabilizer) | 0.05 | 0.01–0.2 |
| Thermolite 187 (Stabilizer) | 0.05 | 0.01–0.2 |

The coating composition prepared using procedures well known in the art is coated on polyethylene terephthalate film, oriented, dried, surface treated and subjected to evaluation (Table II). The subject chromium dioxide formulation exhibits a "Passing" environmental stability (EDGE) rating.

Example XIII

Example XIII (Table 1) is prepared in a manner similar to Example I except that Morthane CA-310, a hydrolytically stable polyurethane produced by Morton Chemical, is used in place of Estane 5701-F1. The coating composition prepared using Morthane CA-310 at a binder ratio of 50/50 is coated on polyethylene terephthalate film, oriented, dried, surface treated and subjected to evaluation (Table II), the subject thermoplastic formulation exhibits outstanding environmental stability.

TABLE I

COATING COMPOSITIONS

| MATERIAL | I | II | III | IV | V | VI | VII | VIII | IX | X | XI | XII[a] | XIII |
|---|---|---|---|---|---|---|---|---|---|---|---|---|---|
| Estane 5701-F1 | 10.40 | 7.28 | 4.16 | | | | 4.06 | | 4.06 | 14.27 | | 7.7 | |
| Morthane CA-310 | | | | | | | | | | | | | 10.40 |
| Vinnol E22/48A | 10.40 | 13.52 | 16.63 | 10.40 | 13.52 | 16.63 | | | 16.24 | | | 7.7 | 10.40 |
| Vinnol VE20/55A | | | | | | | 16.24 | 16.24 | | | 16.19 | | |
| VAGH | | | | | | | | | | 6.12 | | | |
| Hycar 1452X17 | | | | 10.40 | 7.28 | 4.16 | | 4.06 | | | 4.05 | | |
| Oxide | 68.96 | 68.93 | 68.89 | 68.96 | 68.93 | 68.89 | 70.56 | 70.56 | 70.56 | 70.49 | 70.36 | 80.0 | 68.96 |
| Additive (Stability) | 0.22 | 0.26 | 0.32 | 0.22 | 0.26 | 0.32 | 0.16 | 0.16 | | 0.16 | 0.1 | 0.22 | |
| Lubricant | 1.97 | 1.96 | 1.96 | 1.97 | 1.96 | 1.96 | 1.97 | 1.97 | 1.97 | 1.10 | 1.97 | 2.0 | 1.97 |
| Soya Lecithin | 1.36 | 1.36 | 1.36 | 1.36 | 1.36 | 1.36 | 1.57 | 1.57 | 1.57 | 1.20 | 1.57 | 2.5 | 1.36 |
| Carbon | 6.69 | 6.69 | 6.68 | 6.69 | 6.69 | 6.68 | 5.45 | 5.45 | 5.44 | 6.82 | 5.43 | 0 | 6.69 |
| Cross-Linker | | | | | | | | | | | | | |
| Binder Type | A | A | A | | | | B | C | A | D | D | A | |
| Binder Ratio | 50/50 | 65/35 | 85/15 | 50/50 | 65/35 | 85/15 | 80/20 | 80/20 | 80/20 | 70/30 | 80/20 | 50/50 | 50/50 |
| EDGE rating | Pass | Pass | Pass | Fail | Fail | Fail | Fail | Fail | Pass | Fail | Fail | Pass | Pass |
| GSA rating | Pass | Pass | Pass | Fail | Fail | Fail | | | | | Fail | Pass | Pass |

[a]Example XII uses chromium dioxide as magnetic pigment

Description of Tests and Evaluation Results

Following are brief descriptions of specific environmental tests which can be used to distinguish materials like those in the above Examples.

Environmental Debris Generation Evaluation

Environmental Debris Generation Evaluation (EDGE) is a durability test that subjects a full reel of tape (2400 feet) to GSA oven cycle as follows: 10 hours at 120° F., 2-hour cool-down to 40° F., 10 hours at 40° F., 2-hour heat-up to 120° F. This cycle is continued for 120 hours (5 consecutive days) at 75 to 85% relative humidity. After cooling and holding tape at ambient temperature for 4 to 6 hours, the so-stressed tape is passed over a brass rod mounted on a Recortec test fixture. The brass rod is examined, visually and microscopically, for deposited "debris". Grading of debris-deposit amounts is based on a scale of 1 to 5, the higher number indicating the most debris, "1" indicating the least. Performance data for the instant compositions are listed in Table II.

All "Type A" formulations (Examples I, II, III, IX, XII and XIII which contain "Vinnol E22/48A" in combination with Estane 5701 or "Morthane CA-310") registered "Passing" EDGE ratings. All other compositions, including an isocyanate cross-linked Vinnol VE20/55 (Example XI) registered "Failing" debris ratings.

15-Day GSA Cycle

1 This test is performed per U.S. Government test procedure WT-00-51C, paragraphs 3.1.5.2 and 4.3.1.4.2. Typical performance, pass or fail, is given in Table II. Again, the type A binders+ Vinnol E22/48A (Estane 5701 or Morthane CA-310, Examples I, II, III, IX, XII and XIII) show stress resistance that is superior to other evaluated compositions.

TABLE II
ENVIRONMENTAL PERFORMANCE

| Example | Binder Type | EDGE[a] Rating | Value | GSA[b] 15-Day | Comment |
|---|---|---|---|---|---|
| I | A | Pass | 1 | Pass | |
| II | A | Pass | 1 | Pass | |
| III | A | Pass | 1 | Pass | |
| IV | | Fail | 4 | Fail | "Hycar" used |
| V | | Fail | 4 | Fail | "Hycar" used |
| VI | | Fail | 4 | Fail | "Hycar" used |
| VII | | Fail | 4 | — | No maleic ester |
| VIII | | Fail | 4 | — | No maleic ester |
| IX | A | Pass | 2 | — | |
| X | | Fail | 4 | — | |
| XI | | Fail | 4 | — | Cross-linked (with isocyanate) |
| XII | A | Pass | 1 | — | (CrO2) |
| XIII | A | Pass | 1 | Pass | Replace Estane with Morthane |

[a]Values greater than "two" (2) are considered as "Fail". EDGE = Environmental Debris Generation Evaluation (e.g., equate "1" with "little or no debris"; 4 with "lots of debris").
[b]Test per WT-00-51C.

Conclusions

It is a major surprise that only the Type A binders (Examples I, II, III, IX, XII and XIII) pass the durability tests. Evidently the combined urethane vinyl terpolymer with "acid-free" maleic ester ("Vinyl-AFMA") has special unexpected properties, e.g., being more hydro-stable, especially when abraded and when under high heat/humidity conditions. Note "Vinnol E22/48A" is "Vinyl-AFMA" type, whereas "Vinnol VE20/55A" is not (no maleic ester or other maleic acid derivative) nor is "VAGH" (no maleic ester, etc.). Evidently a maleic ester should be present—perhaps as a "sacrificial" aqueous reactant. But no acid, or at least no more than about 0.5 wt. % should be present.

Quite surprising is that cross-linking (cf. Example XI) is no real help. Conventional thinking would have a worker expect that cross-linking would render a thermoplastic more stable environmentally.

Also surprising is how substitution of the rubber-like "Hycar 1452X17" (acrylonitrile butadiene copolymer) for urethane is no help either (note Examples IV, V, VI). One cannot explain this.

Advantages

Workers will appreciate that such thermoplastic materials are relatively inexpensive (e.g., vs. thermoset material such as cross-linked phenoxy urethane), especially where abrasive particles are dispensed-with (allowing replacement with magnetic pigment, making higher loading and higher bit density possible, with fewer drop-outs—which the abrasive can cause). This is especially useful with $CrO_2$ pigment. And, thermoplastics are easier to prepare, as well as more uniform.

Of course, it is conceptually possible to imagine that a stabilizer and/or lubricant system might be incorporated to impart stability to a thermoplastic system, but none comes to mind.

Salient features of the present invention are:

A. A thermoplastic composition of matter comprised of an elastomeric polyurethane and a vinyl copolymer, where the vinyl copolymer is preferably comprised of vinyl chloride, 2-hydroxypropyl acrylate and a maleic anhydride derivative, and where the maleic anhydride derivative is preferably essentially devoid of free acid groups (maximum wt. %=about 0.5)—(note urethane, by itself, appears to hydrolyze excessively).

B. A thermoplastic formulation capable of surviving environmental stress, i.e., no generation of sticky debris, despite high temperature/humidity conditions.

C. A formulation free of critical "process windows", such as pot life, moisture, etc. (e.g., vs. conventional thermoset material).

Related Art

Some related art is as follows:

U.S. Pat. No. 4,400,435; K. Yoda, I. Ohkawa, H. Azegami: involves a binder system comprising a urethane resin and a vinyl chloride-vinyl acetate-maleic acid copolymer having a content of maleic acid of at least 1.5%. The vinyl resin herein taught is different from my instant invention; e.g., whereas free acid groups are present in U.S. Pat. No. 4,400,435, essentially no acid groups are present in my taught invention (compare Structures I above and IV below) I disfavor maleic acid because presence of acidic groups would promote hydrolysis and/or degradation of the urethane component.

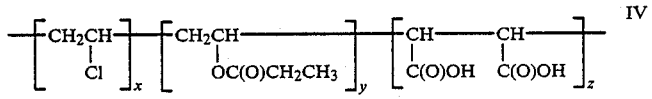

Yoda et al. also teach cross-linking and prescribe the maleic entity only to increase dispersibility. Yoda et al. make no claims as to improved thermal stability.

U.S. Pat. No. 4,414,288; H. Kawahara, H. Azegami: involves a binder system comprising a vinyl chloride-vinyl acetate copolymer containing at least 10% vinyl alcohol, a polyurethane resin and a polyester. The vinyl resin here taught in Kawahara is different from mine (e.g., compare Structures I above and V below—also note that no maleic acid derivative is present in U.S. Pat. No. 4,414,288).

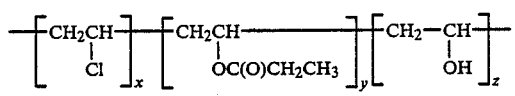

Kawahara and Azegami also prescribe cross-linking as well as enhanced dispersibility, but make no claim to improved thermal stability.

The Kawahara vinyl resin (V) is in the same class of materials represented by "VAGH" (III, also see Example X), a product of Union Carbide. "VAGH" is seen as inferior in a thermoplastic composition containing polyurethane subjected to the environmental conditions taught by the instant invention (see Example X above). In any event, this composition as described in U.S. Pat. No. 4,414,288 is unacceptable to me because it is not sufficiently stable environmentally (e.g., too readily hydrolyzed under high temperature/humidity conditions).

In Example X above it is seen that "Estane 5701F1" in combination with "VAGH" (III, a product of Union Carbide containing 91% vinyl chloride, 3% vinyl acetate and 6% vinyl alcohol) will not pass the environmental stress tests. In fact, to attain a passing evaluation, it was necessary to cross-link this composition. This is significant because it demonstrates the unique and outstanding environmental performance capabilities of the thermoplastic Vinnol E22/48A polyurethane compositions.

Conclusion

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to other tape systems, floppy disks and the like, as well as to other flexible media.

Also, the present invention is applicable for providing abrasion-resistant, environmentally-stable media for other forms of recording and/or reproducing systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. A flexible magnetic medium adapted for high speed digital data recording comprising a substrate and a coating thereon, this coating including a non-cross-linked thermoplastic binder copolymer comprised of an elastomeric urethane essentially free of isocyanate groups plus a vinyl chloride terpolymer having a maleic ester component free of acid groups and an acrylate component wherein the ratio of said elastomeric urethane to said vinyl chloride terpolymer ranges from about 50/50 to about 85/15.

2. The medium in claim 1, wherein the coating further includes pigment comprised of magnetic particulates and wherein the urethane is of high molecular weight.

3. The medium of claim 2 wherein the coating also includes a dispersant for the particulates plus a conductive agent and has little or no moisture sensitivity and is abrasion resistant.

4. The medium as recited in claim 3 wherein the coating also includes a lubricant.

5. The medium of claim 4 wherein the magnetic particulates comprise chromium dioxide.

6. The medium of claim 2 wherein the medium exhibits high hydro-stability even under abrasion and in the face of temperature-humidity extremes.

7. The medium of claim 6 wherein abrasion resistance is such that the coating passes at least one of the following Tests: an EDGE Test, a 15-Day GSA Test and a 6-inch shuttle Test.

8. The medium of claim 2 wherein the coating demonstrates durability by running 100,000 passes or more on a 6-inch shuttle test.

9. The binder of claim 1 wherein the acrylate component is 2-hydroxypropyl acrylate, the resultant copolymer having a glass transition temperature on the order of 25°-65° C.

10. The binder of claim 9, wherein the terpolymer has a vinyl chloride component which is about 78% of the terpolymer.

11. The binder of claim 10, wherein the acrylate component is about 15% of the terpolymer.

12. The binder of claim 1 wherein the vinyl chloride terpolymer has the following basic structure:

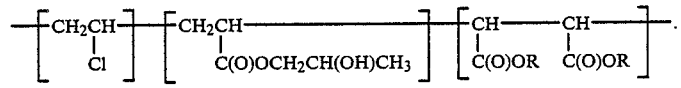

13. The medium of claim 1, wherein the maleic ester component is at least 7 wt. % of the vinyl chloride terpolymer.

* * * * *